US008848232B2

(12) United States Patent
de Beus

(10) Patent No.: US 8,848,232 B2
(45) Date of Patent: Sep. 30, 2014

(54) METHOD AND SYSTEM OF PERFORMING PREPRESS OPERATIONS USING A SHELL DOCUMENT

(75) Inventor: Eric Anthony de Beus, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1178 days.

(21) Appl. No.: 12/240,461

(22) Filed: Sep. 29, 2008

(65) Prior Publication Data

US 2010/0079789 A1 Apr. 1, 2010

(51) Int. Cl.
*G06K 15/00* (2006.01)
*G06F 3/12* (2006.01)

(52) U.S. Cl.
CPC ............ *G06F 3/1206* (2013.01); *G06F 3/1275* (2013.01); *G06F 3/1204* (2013.01); *G06F 3/1285* (2013.01); *G06F 3/1253* (2013.01); *G06F 3/1244* (2013.01)
USPC ........................................ 358/1.18; 358/3.28

(58) Field of Classification Search
USPC ........................................................ 715/249
See application file for complete search history.

(56) References Cited

U.S. PATENT DOCUMENTS 6,295,133 B1 * 9/2001 Bloomquist et al. ......... 358/1.13
6,327,599 B1 * 12/2001 Warmus et al. ............... 715/246
6,332,149 B1 * 12/2001 Warmus et al. ............... 715/246
6,378,983 B1 4/2002 Ito et al.
6,380,951 B1 4/2002 Petchenkine et al.
6,411,396 B1 6/2002 Benson et al.
6,446,100 B1 * 9/2002 Warmus et al. ............... 715/246
6,483,524 B1 11/2002 Petchenkine et al.
6,594,034 B1 * 7/2003 Bloomquist et al. ......... 358/1.18
6,804,028 B1 10/2004 Fukuta
7,061,649 B2 6/2006 Ikeda et al.
7,202,972 B1 4/2007 Schwier et al.
7,242,487 B2 7/2007 Lucivero
7,755,786 B2 7/2010 Foehr et al.
2001/0051964 A1 * 12/2001 Warmus et al. ............... 707/530
2002/0054398 A1 * 5/2002 Bloomquist et al. .......... 358/529
2003/0007167 A1 * 1/2003 Catt et al. ..................... 358/1.12
2004/0141207 A1 * 7/2004 Warmus et al. .............. 358/1.18
2004/0216046 A1 * 10/2004 Warmus et al. ............... 715/530
2005/0190405 A1 9/2005 Tomita
2005/0283720 A1 * 12/2005 Warmus et al. .............. 358/1.18
2005/0283721 A1 * 12/2005 Warmus et al. .............. 358/1.18
2005/0283722 A1 * 12/2005 Warmus et al. .............. 358/1.18
2006/0238803 A1 10/2006 Kuroshima
2007/0127064 A1 * 6/2007 Kuroshima .................. 358/1.13
2008/0024828 A1 * 1/2008 Isoda .......................... 358/3.28
2009/0225344 A1 9/2009 deBeus
2009/0327873 A1 * 12/2009 Cairns .......................... 715/249

* cited by examiner

*Primary Examiner* — Firmin Backer
*Assistant Examiner* — Nicholas Pachol
(74) *Attorney, Agent, or Firm* — Fox Rothschild LLP

(57) ABSTRACT

A method of performing prepress operations with respect to a print job may include receiving, by a prepress workflow system, a document to be processed by a workflow, and automatically generating a shell document corresponding to the received document. The shell document may include a plurality of shell pages, and each one of the plurality of shell pages may include an external reference that corresponds to one of the plurality of received pages. The method may include performing, by a processor, one or more first prepress operations on one or more of the shell pages to produce a modified shell document, performing, by the processor, one or more second prepress operations on one or more of the received pages to produce a modified received document and merging the modified received document and the modified shell document to form a merged document.

8 Claims, 5 Drawing Sheets

METHOD AND SYSTEM OF PERFORMING PREPRESS OPERATIONS USING A SHELL DOCUMENT

BACKGROUND

Automated prepress workflow systems typically perform a variety of prepress operations. Such systems typically process a digital document by performing a variety of operations on the document prior to sending it to a printer. For example, a prepress workflow system may scale, rotate or otherwise manipulate an image that is included in a document, format text into a particular font, size, color, language or orientation, or the like. Exemplary prepress systems include those described in U.S. Pat. No. 6,295,133 to Bloomquist et al.; U.S. Pat. No. 6,378,983 to Ito et al.; U.S. Pat. No. 6,380,951 to Petchenkine et al.; U.S. Pat. No. 6,411,396 to Benson et al.; and U.S. Pat. No. 6,483,524 to Petchenkine et al.

In some cases, automated prepress workflow systems perform operations on page description language (PDL) documents, such as Portable Document Format (PDF) documents and PostScript (PS) documents. Once such prepress operations are performed, soft-proofing (i.e., displaying an exemplary digital rendering of one or more pages of a PDL document on a computer screen, display or other image-based system) can be performed on the documents. In addition, PDL documents can be submitted to a printing device for printing.

Performing prepress operations on large or complex PDL documents can be time-consuming and computationally intensive. Prepress operations could even fail if intermediate and/or final versions of a large PDL document are created because such versions may exhaust system resources during processing.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms “a,” “an,” and “the” include plural reference unless the context clearly dictates otherwise. Unless defined otherwise, all technical and scientific terms used herein have the same meanings as commonly understood by one of ordinary skill in the art. As used herein, the term “comprising” means “including, but not limited to.”

In an embodiment, a method of performing prepress operations with respect to a print job may include receiving, by a prepress workflow system, a document to be processed by a workflow. The received document may include a plurality of received pages. The method may also include automatically generating a shell document corresponding to the received document. The shell document may include a plurality of shell pages, and each one of the plurality of shell pages may include an external reference that corresponds to one of the plurality of received pages. The method may include performing, by a processor, one or more first prepress operations on one or more of the shell pages to produce a modified shell document, performing, by the processor, one or more second prepress operations on one or more of the received pages to produce a modified received document and merging the modified received document and the modified shell document to form a merged document.

In an embodiment, a method of performing prepress operations with respect to a print job may include receiving, by a prepress workflow system, a document to be processed by a workflow and automatically generating a shell document corresponding to the received document. Each page of the shell document may include an external reference that corresponds to a page of the received document. The method may also include performing, by a processor, one or more first prepress operations on the shell document to produce a modified shell document, performing, by the processor, one or more second prepress operations on the received document to produce a modified received document and merging the modified shell document and the modified received document to produce a merged document.

In an embodiment, a system for performing prepress operations with respect to a print job may include a prepress workflow system and a printing device in communication with the prepress workflow system. The prepress workflow system may be configured to receive a document to be processed by a workflow and generate a shell document corresponding to the received document. Each page of the shell document may include an external reference that corresponds to a page of the received document. The prepress workflow system may also be configured to perform one or more first prepress operations on the shell document to produce a modified shell document, and perform one or more second prepress operations on the received document to produce a modified received document. The printing device may be configured to print the modified shell document and the modified received document.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a “printing device” refers to an electronic apparatus that is capable of receiving commands, printing text, vector graphics and/or images on a substrate and/or scanning a document. Printing devices may include, but are not limited to, network printers, production printers, copiers, facsimile machines and/or other devices using ink or toner.

A “workflow” refers to an ordered sequence of operations designed to enable repeatable processing of submitted documents. A workflow may include operations that transform a document in some manner and/or result in the display, transmission or conversion into physical form of the document.

A “prepress workflow system” refers to a processor-based system for receiving and processing a workflow prior to sending information to a printing device. A prepress workflow system may include, without limitation, a computer, a standalone processor, an embedded system or the like. In addition, a prepress workflow system may further include, without limitation, memory, such as random access memory (RAM), a hard drive and/or the like. A prepress workflow system may be in operable communication with one or more printing devices.

A "prepress operation" refers to a preparatory service that is performed on a document before the document reaches a production stage.

Automated prepress workflow systems may enable the generation of workflows that include discrete prepress operations to be applied in sequence to input documents. Exemplary prepress operations may include, without limitation, converting a document from a first page description language ("PDL") to a second PDL, performing color management operations, preflighting to identify potential print incompatibilities, performing imposition, rotation, mirroring, cropping and/or resizing in a document or a portion of a document, joining documents, adding one or more pressmarks, such as color bars, and/or adding one or more of a page number, a Bate stamp, text, an image watermark and a barcode. In an embodiment, a color management operation may include removing red-eye removal, performing color conversion and/or the like.

Workflows enable automatic performance of such discrete prepress operations to one or more documents. For example, a large number of documents may be passed through a sequence of discrete prepress operations without human intervention if the documents each require similar processing. In an embodiment, a user may select one or more workflows from a plurality of predefined workflows to perform on one or more documents.

Figure 1:
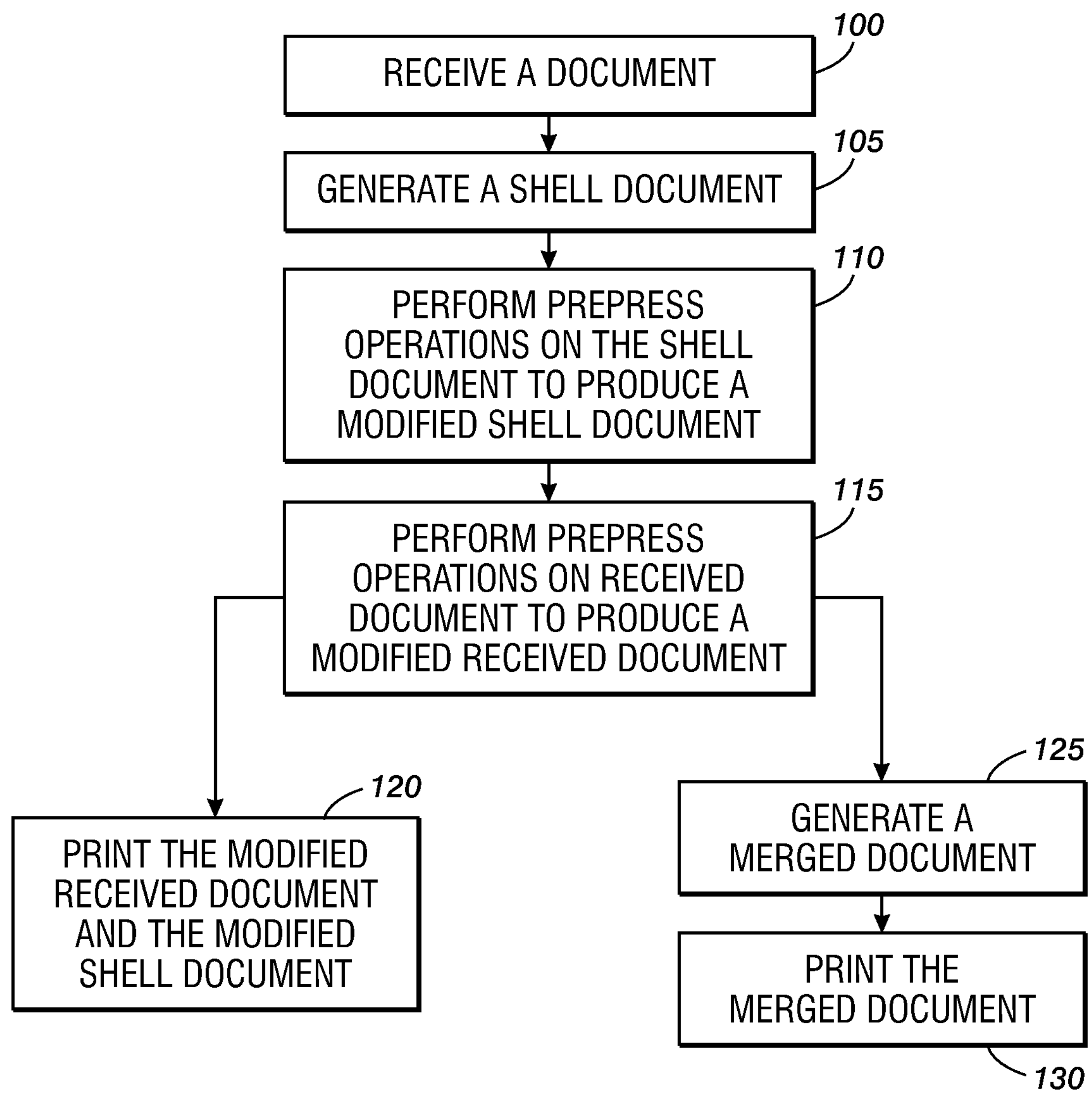
FIG. 1 illustrates an exemplary method of performing prepress operations for a workflow according to an embodiment.

FIG. 1 illustrates an exemplary method of performing prepress operations for a workflow according to an embodiment. In an embodiment, a document may be received 100. The document may be a PDL document, such as a Portable Document Format ("PDF") document, a PostScript ("PS") document and/or the like.

In an embodiment, the received document may include one or more pages which may include a digital representation of an image. The image may include text, diagrams, pictures, drawings and/or the like. The image may also include any combination of the foregoing.

In an embodiment, a shell document corresponding to the received document may be generated 105. A shell document may be a PDL document such as a PDF document, a PS document and/or the like. In an embodiment, a shell document may include one or more pages. In an embodiment, a shell document may have the same number of pages as the received document. One or more shell document pages may include an external reference. An external reference may be text, a tag and/or the like that identifies a corresponding page in the received document. For example, an external reference on page 3 of the shell document may read "Shell document page 3—corresponds to received document page 3."

In an embodiment, one or more prepress operations may be performed 110, 115 on the received document and/or the shell document. In an embodiment, prepress operations that do not alter an image may be performed 110 on the shell document to produce a modified shell document. For example, if page 2 of the received document requires a watermark, a watermark prepress operation may be performed 110 on page 2 of the shell document. In an embodiment, prepress operations that require alterations to an image, such as red-eye removal, color conversion and/or the like, may be performed 115 on the received document to produce a modified received document.

In an embodiment, the modified received document and the modified shell document may be printed 120. In an embodiment, a digital representation of an image corresponding to a received document page may be printed on the same media sheet as the corresponding shell document page. For example, if page 4 of a received document corresponds to page 4 of a shell document, then a digital representation of an image corresponding to page 4 of the received document may be printed on the same media sheet as page 4 of the shell document. In an embodiment, a media sheet may be a physical sheet of paper, plastic and/or other suitable substrate for printing images thereon. As such, a media sheet may include the prepress operations that were applied to a page of the shell document, as well as those applied to the digital representation of an image of the received document page corresponding to the shell document page.

In an alternate embodiment, a merged document may be generated 125. Each page of the received document may be merged 125 with its corresponding shell document page to produce a merged document page. For example, a workflow may require adding a watermark to every page in a document, and performing red-eye removal on all pages having an even page number. After these prepress operations are performed on the shell document and the received document, respectively, the pages of each may be merged to produce a merged document. For example, page 2 of the shell document, having a watermark, and page 2 of the received document, having a post-red-eye removal image, may be merged to produce page 2 of a merged document. As such, page 2 of the merged document may include the watermark from the shell document page and the image of the received document page. In an embodiment, a merged document may be printed 130.

Figure 2:
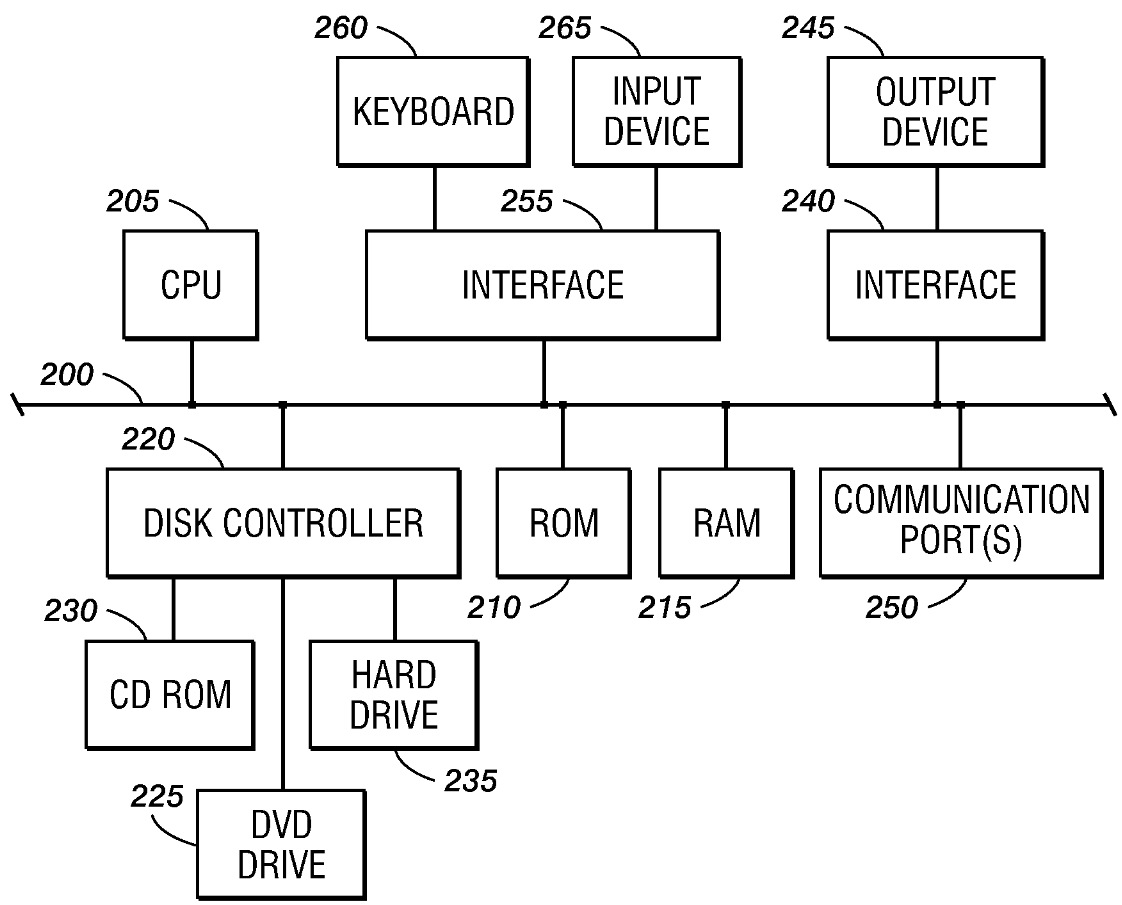
FIG. 2 depicts a block diagram of exemplary internal hardware that may be used to contain or implement the program instructions according to an embodiment.

FIG. 2 depicts a block diagram of exemplary internal hardware that may be used to contain or implement the program instructions according to an embodiment. A bus 200 serves as the main information highway interconnecting the other illustrated components of the hardware. CPU 205 is the central processing unit of the system, performing calculations and logic operations required to execute a program. Read only memory (ROM) 210 and random access memory (RAM) 215 constitute exemplary memory devices.

A disk controller 220 interfaces with one or more optional disk drives to the system bus 200. These disk drives may include, for example, external or internal DVD drives 225, CD ROM drives 230 or hard drives 235. As indicated previously, these various disk drives and disk controllers are optional devices.

Program instructions may be stored in the ROM 210 and/or the RAM 215. Optionally, program instructions may be stored on a tangible computer readable medium such as a compact disk or a digital disk or other recording medium.

An optional interface 240 may permit information from the bus 200 to be transmitted to an output device 245. For example, the interface 240 may permit information from the bus 200 to be displayed on a display in audio, graphic or alphanumeric format. In an embodiment, the interface 240 may permit information from the bus 200 to be printed by a printing device. Additional and/or alternate output devices may be used within the scope of this disclosure. Communication with external devices may occur using various communication ports 250. An exemplary communication port 250 may be attached to a communications network, such as the Internet or an intranet.

In an embodiment, the hardware may include an interface 255 which allows for receipt of data from input devices such as a keyboard 260 or other input device 265 such as a mouse, a touch screen, a remote control, a pointer and/or a joystick.

An embedded system, such as a sub-system within a xerographic apparatus, may optionally be used to perform one, some or all of the operations described herein.

Figure 3:
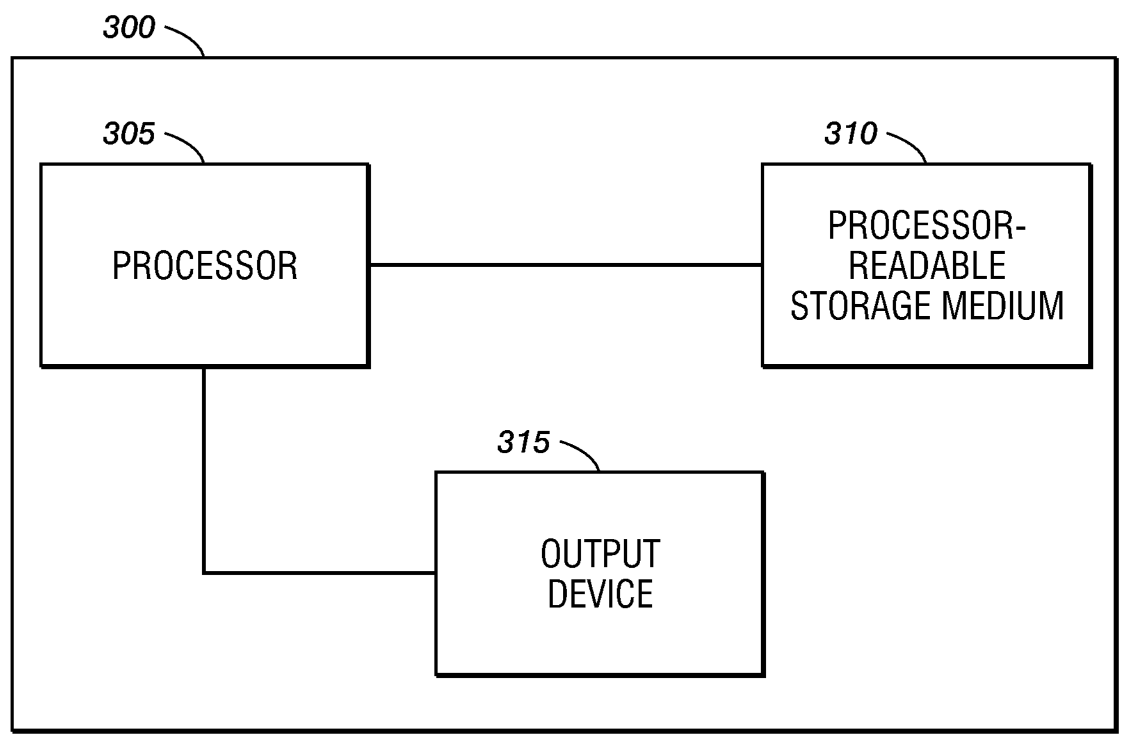
FIG. 3 illustrates an exemplary system that may perform one, some or all of the operations described herein according to an embodiment.

FIG. 3 illustrates an exemplary system that may perform one, some or all of the operations described herein. As illustrated by FIG. 3, the system 300 may include a processor 305, a processor-readable storage medium 310 in communication with the processor, and an output device 315 in communication with the processor. The processor may be configured to received a document to be processed by a workflow and generate a shell document corresponding to the received document. The processor may also be configured to perform one or more prepress operations on the received document and/or the shell document. The output device 315 may include a display device, a printing device and/or the like. Likewise, a multiprocessor system may optionally be used to perform one, some or all of the operations described herein.

Figure 4:
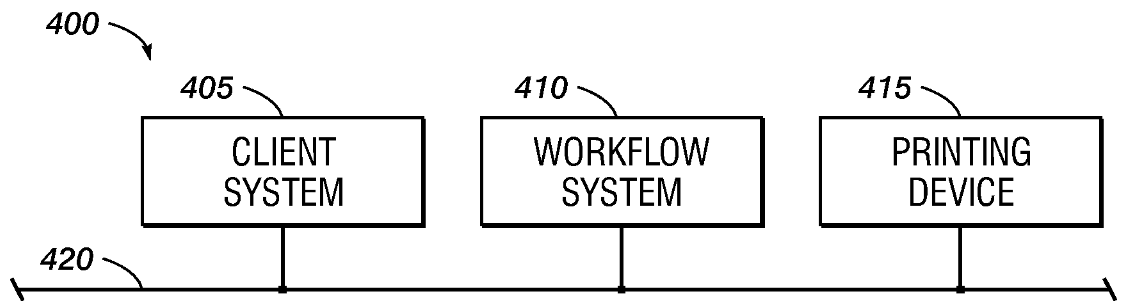
FIG. 4-6 illustrate exemplary systems that each may perform one, some or all of the operations described herein according to embodiments.

FIG. 4 illustrates an exemplary system that may perform one, some or all of the operations described herein. As illustrated by FIG. 4, the system 400 may include a client system 405, a workflow system 410 and a printing device 415. In an embodiment, the client system 405, workflow system 410 and printing device 415 may communicate with one another via a network 420. In an embodiment, the client system 405 may be configured to receive a document to be processed and to transmit the document to the workflow system 410. The workflow system 410 may be configured to receive the document from the client system 405 and to generate a shell document. In an embodiment, the workflow system 410 may be configured to merge the received document and the stored document to produce a merged document. The workflow system 410 may be configured to store the merged document. In an embodiment, the printing device 415 may be configured to merge the received document and the shell document. In addition, the printing device 415 may be configured to print the merged document.

Figure 5:
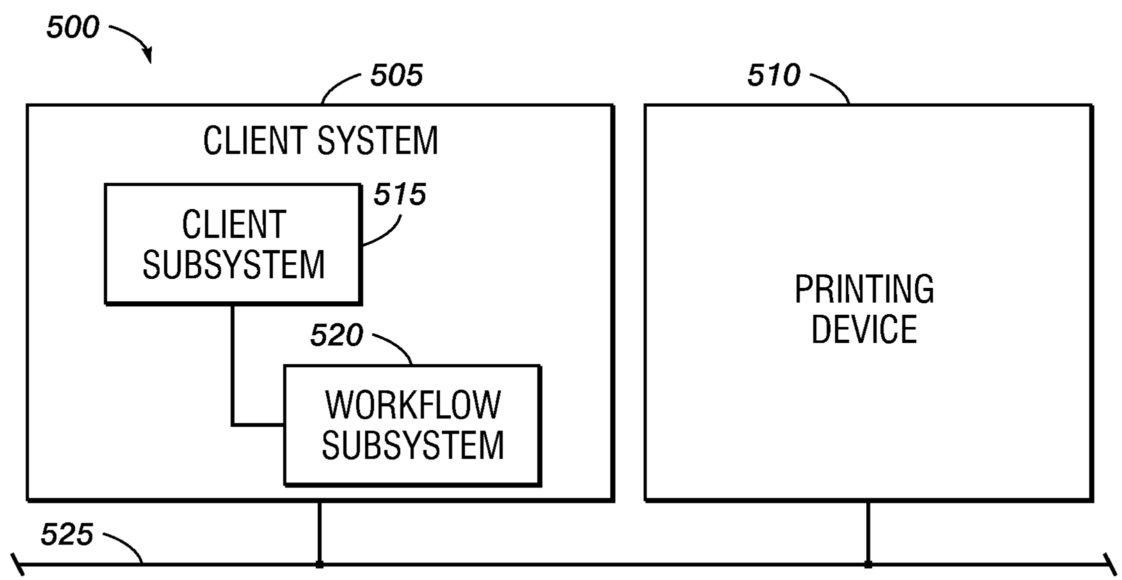

FIG. 5 illustrates an exemplary system that may perform one, some or all of the operations described herein. As illustrated by FIG. 5, the system 500 may include a client system 505 and a printing device 510. In an embodiment, the client system 505 and the printing device 510 may communicate with one another via a network 525. The client system 505 may include a client subsystem 515 and a workflow subsystem 520. The client subsystem 515 may be configured to receive a document to be processed. The workflow subsystem 520 may be configured to receive the document from the client subsystem 515 and to generate a shell document. In an embodiment, the workflow subsystem 520 may be configured to merge the received document and the shell document to produce a merged document, and to store the merged document in memory. In an embodiment, the printing device 510 may be configured to merge the received document and the shell document. The printing device 510 may be configured to print the merged document.

Figure 6:
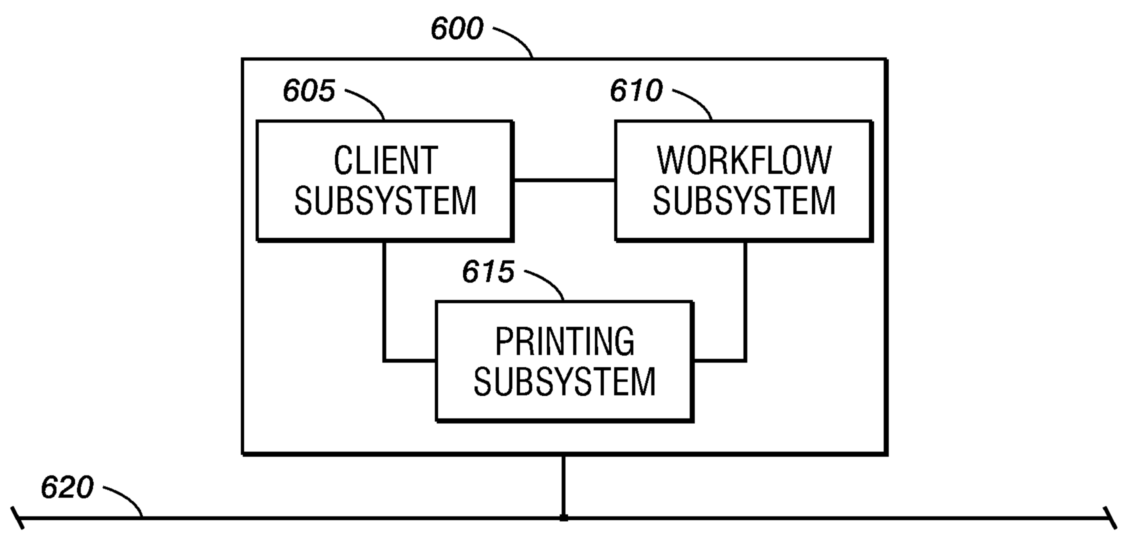

FIG. 6 illustrates an exemplary system that may perform one, some or all of the operations described herein. As illustrated by FIG. 6, the system 600 may include a client subsystem 605, a workflow subsystem 610 and a printing subsystem 615. In an embodiment, the system 600 may be in communication with a network 620. The client subsystem 605 may be configured to receive a document to be processed. The workflow subsystem 610 may be configured to receive the document from the client subsystem 605 and to generate a shell document. In an embodiment, the workflow subsystem 610 may be configured to merge the received document and the shell document to produce a merged document. The workflow subsystem 610 may be configured to store the merged document in memory. The printing subsystem 615 may be configured to print the merged document.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of performing prepress operations with respect to a print job, the method comprising:

receiving, by a prepress workflow system, a page description language document to be processed by a workflow, wherein the received document comprises a plurality of received pages, wherein the document comprises one or more digital representations of one or more images;

automatically generating a page description language shell document corresponding to the received document, wherein the shell document comprises a plurality of shell pages, wherein each one of the plurality of shell pages comprises an external reference for identifying a corresponding one of the plurality of received pages wherein the external reference comprises one or more of the following:

text, and a tag;

performing, by a processor, one or more first prepress operations on one or more of the shell pages to produce a modified page description language shell document, wherein the one or more first prepress operations comprise one or more prepress operations that are not capable of altering the one or more digital representations of one or more images in the received document;

performing, by the processor, one or more second prepress operations on one or more of the received pages to produce a modified received document, wherein the one or more second prepress operations comprise one or more prepress operations that alter at least a portion of the one or more digital representations in the received document; and merging the modified received document and the modified page description language shell document to form a merged document, wherein the merging comprises, for each modified shell document page:

identifying a corresponding modified received document page using the external reference associated with the modified shell document page, identifying a digital representation of an image associated with the modified received document page, and merging the identified digital representation and the modified shell document page.

2. The method of claim 1, further comprising storing the merged document in memory.

3. The method of claim 1, further comprising generating prints from the merged document.

4. The method of claim 3, wherein the printing comprises, for each shell document page in the modified page description language shell document:

identifying a corresponding received page in the modified received document using the external reference associated with the shell document page;

identifying a digital representation of an image associated with the corresponding received page; and printing the digital representation of the image and the shell document page on a media sheet.

5. A method of performing prepress operations with respect to a print job, the method comprising:

receiving, by a prepress workflow system, a page description language document to be processed by a workflow, wherein the document comprises one or more digital representations of one or more images;

automatically generating a page description language shell document corresponding to the received document, wherein each page of the shell document comprises an external reference that identifies a corresponding page number of the received document, wherein no page of the shell document comprises the one or more digital representations of one or more images, and wherein the external reference comprises one or more of the following: text, and a tag;

performing, by a processor, one or more first prepress operations on the shell document to produce a modified page description language shell document, wherein the one or more first prepress operations comprise one or more prepress operations that are not capable of altering the one or more digital representations of one or more images in the received document;

performing, by the processor, one or more second prepress operations on the received document to produce a modified received document, wherein the one or more second prepress operations comprise one or more prepress operations that alter at least a portion of the one or more digital representations of one or more images in the received document; and merging the modified page description language shell document and the modified received document to produce a merged document, wherein the merging comprises, for each modified shell document page:

identifying a corresponding modified received document page using the external reference that identifies the corresponding page number associated with the modified shell document page, identifying a digital representation of an image associated with the modified received document page, and merging the identified digital representation and the modified shell document page.

6. The method of claim 5, further comprising storing the merged document in memory.

7. The method of claim 5, further comprising generating prints from the merged document.

8. A system for performing prepress operations with respect to a print job, the system comprising:

a computing device;

a printing device in communication with the computing device; and a computer-readable storage medium in communication with the computing device wherein the computer-readable storage medium comprises one or more programming instructions that, when executed, cause the computing device to:

receive a page description language document to be processed by a workflow, wherein the received document comprises a plurality of received pages, wherein the document comprises one or more digital representations of one or more images;

generate a page description language shell document corresponding to the received document, wherein the shell document comprises a plurality of shell pages, wherein each one of the plurality of shell pages comprises an external reference for identifying a corresponding one of the plurality of received pages wherein the external reference comprises one or more of the following:

text, and a tag;

perform one or more first prepress operations on one or more of the shell pages to produce a modified page description language shell document, wherein the one or more first prepress operations comprise one or more prepress operations that are not capable of altering the one or more digital representations of one or more images in the received document; and perform one or more second prepress operations on the one or more received pages to produce a modified received document, wherein the one or more second prepress operations comprise one or more prepress operations that alter at least a portion of the one or more digital representations of one or more images in the received document; and generate a merged document comprising the modified page description language shell document and the modified received document, wherein the merging comprises, for each modified shell document page:

identifying a corresponding modified received document page using the external reference associated with the modified shell document page, identifying a digital representation of an image associated with the modified received document page, and merging the identified digital representation and the modified shell document page;

wherein the printing device is configured to print the merged document.

* * * * *